Aug. 15, 1933. L. R. HEIM 1,922,805
BEARING CONSTRUCTION AND ART OF MAKING THE SAME
Filed Oct. 4, 1930 2 Sheets-Sheet 1
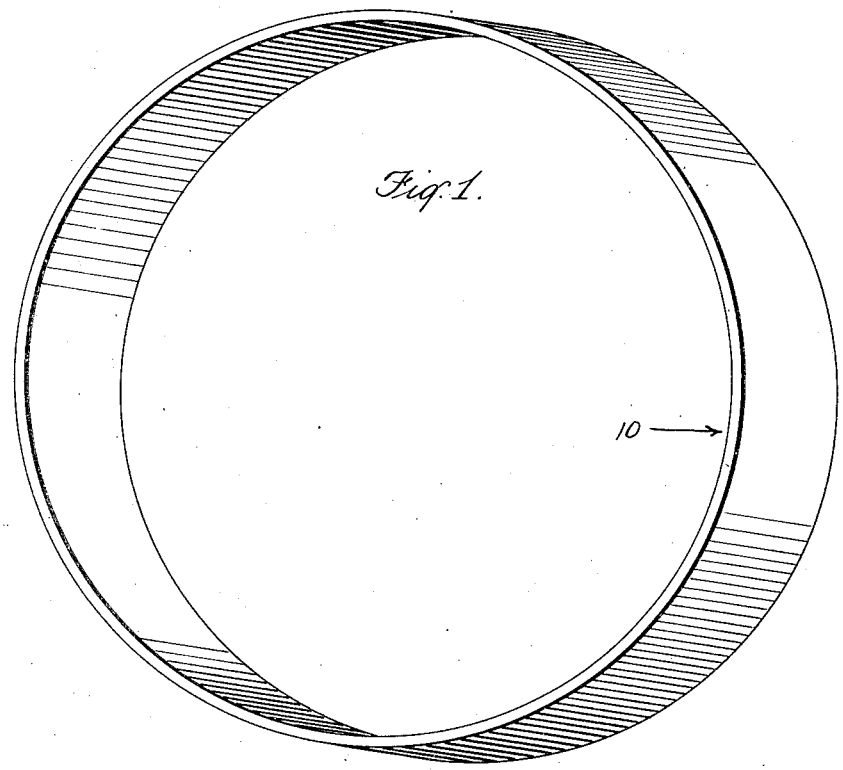
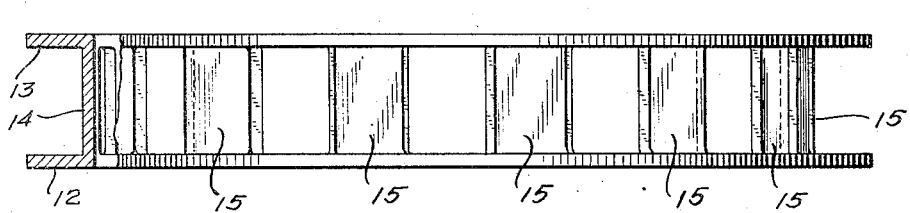
INVENTOR
ATTORNEY Aug. 15, 1933.  L. R. HEIM  1,922,805
BEARING CONSTRUCTION AND ART OF MAKING THE SAME
Filed Oct. 4, 1930   2 Sheets-Sheet 2
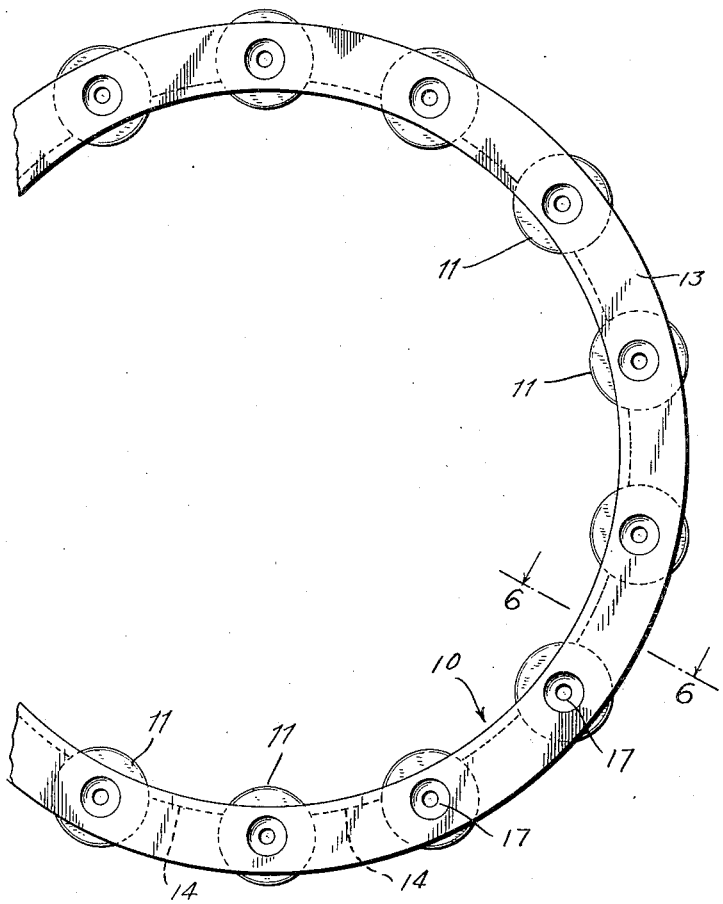
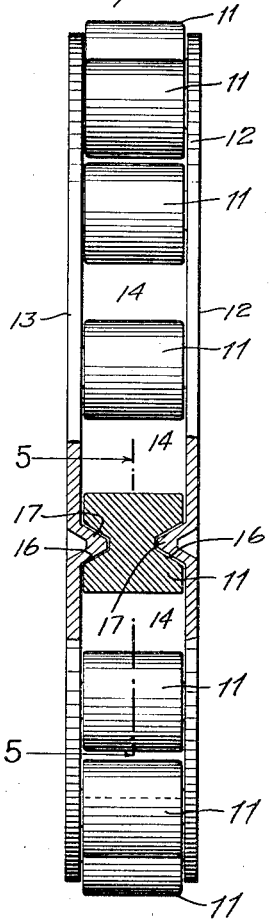
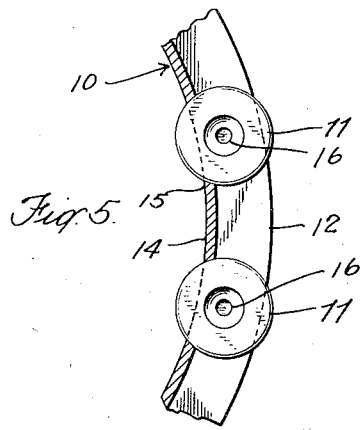
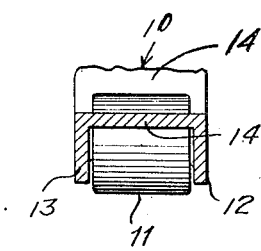
Lewis R. Heim
INVENTOR
BY James Blair Curtis
ATTORNEY Patented Aug. 15, 1933

1,922,805

UNITED STATES PATENT OFFICE 1,922,805

BEARING CONSTRUCTION AND ART OF MAKING THE SAME

Lewis R. Heim, Danbury, Conn.

Application October 4, 1930. Serial No. 486,314

6 Claims. (Cl. 29—148.4)

This invention relates to bearing construction, more particularly to bearings of the roller type, and to an art of making the same.

One of the objects of this invention is to provide a durable device of the above nature which will be practical and efficient in operation. Another object is to provide an efficient one-piece cage for retaining rollers in bearings of the above type. Another object is to provide parts of a cage of the above-described character to dependably retain rollers in bearings with a minimum amount of friction. Other objects are to increase the life of the bearing by reducing friction, to provide a device of ready assembly with minimum risk of creating defective bearings through careless workmanship or any other cause, and in general to provide an improved bearing construction of this type. Another object is to provide a method of constructing bearings of the above character which will be simple, practical, and readily practiced under all conditions. Another object is to provide a method of the above character which will necessitate a minimum amount of labor and mechanical facilities which can be carried on at high speed, and which will result in consistently uniform production. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which certain steps of my method are illustrated and in which is shown one of the various possible embodiments of the mechanical features of my invention, Figure 1 is a perspective view of a sheet metal part in one stage of its manufacture;

Figure 2 is an end elevation, partly in section, showing the member of Figure 1 in subsequent stages of its construction;

Figure 3 is a fragmentary end elevation showing the completed bearing in detail;

Figure 4 is a side elevation of the bearing construction as view from the right in Figure 3, certain parts being shown in section;

Figure 5 is a sectional view taken along the line 5—5 of Figure 4, and

Figure 6 is a sectional view taken along the line 6—6 of Figure 3, showing in detail certain relations of the rolls to the cage.

Similar reference characters refer to similar parts throughout the several views of the drawings.

Referring now to the drawings and more particularly to Figure 1, I first form a cylindrical sleeve-like member 10 of a suitable sheet metal, preferably by cutting a suitable axial length off of a sheet metal type or shell having an inside diameter approximating the diameter of the member or shaft, or the like, which the rollers, indicated at all in Figures 3 and 4, are to contact or about which the rollers are to extend and roll.

The axial length of the member 10 is sufficient to include the axial length of the rollers 11 and also less than twice the diameter of the rollers 11. In any suitable manner, as with dies, for example, I turn or bend up the respective end portions of the member 10 (Figure 1) to form two axially spaced flanges 12 and 13, as is better shown in Figure 2, the spacing between the flanges being preferably slightly greater than the axial length of the rollers 11, the flanges 12 and 13 being thus connected and held in spaced relation by an intermediate portion of the shell 10 designated at 14 in Figure 2.

At regular intervals about the cylindrical portion 14 I cut out, stamp, or otherwise form, openings or slots 15 having an axial length at least as great as the spacing between the flanges 12 and 13, these slots or openings 15 being equivalent in number to the number of rolls 11 that the mechanical requirements of the ultimate roller bearing indicate. These slots 15 have a dimension in the direction of the circumference of the intermediate portion 14 that is preferably somewhat less than the diameter of the rolls 11. In Figure 2 these slots 15 are shown in end elevation while in Figure 5 the slots are shown in section and the preferred relation of their dimension in the direction of the circumference of the portion 14 to the diameter of the rolls 11 is clearly indicated.

The rollers 11 made of any suitable material such as steel and preferably ultimately hardened, are preferably cylindrical and each is provided with recesses 16 (see the sectional portion of Figure 4) in their end faces, these recesses being preferably substantially conical and having their axes coincident with each and with the axis of rotation of the roller.

I thereupon assemble the rolls 11 with respect to the member 10, formed as above described, the rollers fitting relatively loosely between the side flanges 12 and 13 and each projecting through a recess 15, all as is clearly indicated in Figures 3, 4, 5 and 6. In any suitable manner I hold the rollers 11 and the member 10 in the thus assembled relation, insuring, by any such suitable holding means, that the axes of the rollers 11 lie in a circle whose center coincides with the center of the cylindrical member 10. Then, by means of any suitable tool, I press opposed portions of the spaced flanges 12 and 13 into the recesses 16 in the respective ends of the rollers 11; preferably the tools I employ for achieving this step are shaped so that the portions of the flanges 12 and 13 that are thus pressed inwardly are substantially cone-shaped as is indicated at 17 in Figure 4. In this operation the walls of the recesses 16 in the rollers 11 may, if desired, be made to cooperate to shape the inwardly directed projections 17 so that they will present nicely mating surfaces to the walls of the recesses 16 in the rolls 11.

Or, if desired, I may first form the inwardly directed projections 17 on the side flanges 12 and 13 before the latter are bent completely into their 90° relation to the cylindrical portion 14 (see Figure 2), insuring, in that case, that the projections 17 on the two flanges 12 and 13, lie on circles of the same diameter and whose centers coincide with each other and with the center of the cylindrical member 10. In that case, also, the rollers 11 are inserted between the flanges 12 and 13 and as the latter are brought finally to the desired 90° relation to the cylindrical portion 14, the inwardly directed projections 17 enter the respective opposed recesses 16 in the rollers 11.

In any case, the projections 17 fit relatively loosely in the recesses 16 in the rolls and preferably also I provide for adequate clearance between the rollers 11 themselves and the opposed edges of the cylindrical portion 14 (see Figures 5 and 3) which define two of the walls of the recesses 15.

In actual use, the two relatively rotating members to be supported with respect to each other through the roller bearing construction above described are appropriately assembled with the rollers 11 therebetween, one of the members contacting those portions of the rollers 11 (see Figure 3) that project inwardly of the device 10 and the outer or other member contacting those portions of the rollers 11 that project outwardly of the device 10. The rollers 11, fitting nicely between these two members, transmit the load from one member to the other as relative rotation therebetween takes place and as the rollers 11 roll, the device 10 is rotated about its own axis. The preferred relatively loose fit of the rollers 11 between the flanges 12 and 13 and the preferred relatively loose fit of the projections 17 into the recesses 16 of the rollers 11 insure that the friction between these parts is reduced to a minimum and insure adequate leeway or play to permit the rollers themselves to be nicely and properly alined by the two members between which they are interposed; this feature also reduces the necessity for an otherwise unusually high degree of precision both in the construction and inter-relation of the various parts and in the assembly of the parts. The rollers 11, of course, can be readily ground to true cylindrical form in any preferred manner.

Preferably the inwardly directed projections 17 and the recesses 16 (see the sectioned portion of Figure 4) are so proportioned and shaped that whatever play exists between the rollers 11 and the projections 17 is insufficient to permit the end walls or surfaces of the rolls from contacting with the inside faces of the flanges 12 and 13, and by this arrangement I am enabled further to reduce friction; it will be appreciated that the substantial areas of the end faces of the rollers 11 and of those portions of the inside faces of the flanges 12 and 13 that would otherwise contact with these end faces of the rollers 11 present the possibility of giving rise to substantial rubbing action with consequent waste of energy and wear of parts.

The rollers are thus dependably held in assembled relation, the portions of the cylindrical part 14 (see Figures 3 and 5) that intervene the apertures or slots 15 through which the rollers 11 project, insure the pendable maintenance of the intended spacing between the ring-like flanges 12 and 13. The retaining device for the rollers 11 may, moreover, be made of any suitable light construction permitted by the requirements of the ultimate bearing and thus the high efficiency of action of the bearing is further enhanced.

It will thus be seen that there has been provided in this invention an art and construction in which the various objects hereinbefore noted, together with many thoroughly practical advantages are successfully achieved. It will be seen that the art may be readily carried on in practice and that the resulting bearing construction is well adapted to meet the varying conditions of hard practical use.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In a roller bearing, in combination, a substantially cylindrical sheet-metal shell having parallel slots extending crosswise thereof and continuous spaced annular flanges projecting from the periphery of said shell and integral therewith, rolls disposed within said slots and provided with concaved ends, and regularly spaced hollow convex portions pressed inwardly of said flanges and extending into said concaved ends of said rolls to retain said rolls in their respective slots.

2. In a roller bearing, in combination, a substantially cylindrical sheet-metal shell having a series of parallel slots extending crosswise thereof and continuous outwardly projecting spaced flanges forming a part of said shell adjacent the ends thereof, bearing rolls disposed about said shell and each positioned within one of said slots, the diameter of the rolls being greater than the peripheral length of the slots and the ends of said rolls being concaved, and conical projections extending from said flanges and inwardly into said concaved ends of said rolls to retain said rolls in said slots.

3. The herein described art which consists in forming parallel spaced flanges at the ends of a cylindrical sheet-metal shell, forming a series of peripherally spaced slots in the shell and between said flanges, forming recesses in the ends of bearing rolls, pressing the metal of said sheet metal flanges inwardly at intervals coincident with the spacing of said slots, placing rolls in between said flanges and in said slots, and forcing said flanges toward each other to cause said inwardly pressed portions of said flanges to enter the recesses in said rolls.

4. In a roller bearing, in combination, a substantially cylindrical one piece cage unit having a series of parallel slots extending crosswise thereof and outwardly extending spaced flanges on its opposite sides substantially adjacent the ends of said slots, a series of rolls disposed within said slots between said flanges, said rolls having concaved ends, and a plurality of substantially conical projections extending inwardly from said flanges into the concaved ends of said rolls.

5. The herein described art which consists in stamping a plurality of parallel slots in a cylindrical shell, said slots being spaced from the opposite sides of said shell, bending the opposite sides of said shell upwardly in a direction toward each other, forming a series of indentations in said sides to form regularly spaced projections on one surface of said sides, disposing a plurality of rolls in said slots, said rolls having concaved ends, and bending said sides toward each other so that said projections interfit with the concaved ends of said rolls.

6. The herein described art which consists in stamping a series of parallel slots about the periphery of a cylindrical shell, the ends of said slots being spaced from the sides of said shell, bending the sides of said shell toward each other so that both sides form flanges extending away from the plane of said slots in substantially the same direction, placing a series of rolls in said slots, said rolls having concaved ends, and forcing portions of said flanges into the concaved ends of said rolls to retain said rolls against axial displacement.

LEWIS R. HEIM.